United States Patent Office 2,736,726
Patented Feb. 28, 1956

2,736,726
BASIC PHOSPHORIC ACID ESTERS

Karl Gaetzi and Paul Müller, Basel, Switzerland, assignors to J. R. Geigy A. G., Basel, Switzerland, a Swiss firm No Drawing. Application March 16, 1953,
Serial No. 342,736

Claims priority, application Switzerland March 28, 1952

9 Claims. (Cl. 260—247.1)

This invention concerns new phosphoric acid esters with a basic ester component, of the general formula

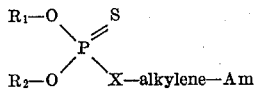

wherein:

$R_1$ and $R_2$ each represent an alkyl radical,
X represents sulphur or oxygen.
Am represents a dialkylamino group, an alkylenimino or the morpholino group, and
Alkylene represents an alkylene group with from 2 to 4 carbon atoms.

It has now been found that these compounds have a markedly toxic effect on insetcs and also on leaf aphids and red spiders in all stages of development.

Phosphoric acid esters of the general formula given above can be produced easily, for example by reacting a salt of a phosphoric acid diester of the general formula:

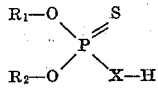

with a halogen alkylamine of the general formula:

Y—alkylene—Am wherein $R_1$, $R_2$, X, Am and alkylene have the meanings given above, and Y represents chlorine or bromine. The alkali metal salts, including ammonium salts can be used as salts of the acid phosphoric acid esters.

It is of advantage to perform the reactions in the presence of an indifferent solvent, e. g. in a low molecular aliphatic alcohol or ketone, in a carboxylic acid ester or a benzene hydrocarbon.

Generally, the most favourable reaction temperature lies between 20 and 100° and is dependent on the reaction components so this statement is not in any way a limitation.

Instead of reacting the salts of phosphoric acid diesters with the halogen alkylamines, also phosphoric acid diesters themselves can be used in the presence of acid binding agents such as, e. g. sodium or potassium carbonate, pyridine or dimethyl aniline.

A further way in which the new basic phosphoric acid esters can be produced consists in the reaction of a phosphoric acid diester halide of the general formula:

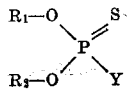

with an alkali metal salt of a primary or secondary basic alcohol or mercaptan of the general formula:

H—X—alkylene—Am wherein $R_1$, $R_2$, X, Am, Y and alkylene have the meanings given above, if necessary in an inert solvent and at a raised temperature. Also the free basic alcohols or mercaptans can be used in the presence of acid binding agents instead of alkali metal salts.

As starting materials in the processes described above, there can be used on the one hand for example: dimethyl-, diethyl-, di-isopropyl- or di-n-butyl-phosphoric acid ester, -thiophosphoric acid ester or -dithiophosphoric acid ester or the chlorides or bromides of these phosphoric acid diesters or thiophosphoric acid diesters (dialkoxy-phosphoryl halides or dialkoxy-thiophosphoryl halides), and on the other hand for example, dimethylamino-, diethylamino-, dibutylamino-, pyrrolidino-, piperidino- and morpholino-ethyl chloride or -ethyl bromide, β-dimethlylamino-, β-diethylamino-, β-piperidino-, β-morpholino-, γ-dimethylamino-, γ-diethylamino- and γ-piperidino-propyl chloride, β-dimethylamino-isopropyl chloride or dimethylamino- and diethylamino-ethanol, β-dimethylamino-, β-diethylamino- and γ-piperidino-propanol, β-dimethylamino-isopropanol, δ-dimethylamino-, δ-diethylamino- and δ-piperidino-n-butanol.

The following examples illustrate the production of the new compounds. Parts are given as parts by weight and the relationship thereof to parts by volume is as that of grammes to cubic centimetres. The temperatures are given in degrees centigrade.

Example 1

21 parts of the sodium salt of O.O-diethyl-dithio-phosphoric acid ester are dissolved in 200 parts by volume of anhydrous acetone, 14 parts of freshly distilled β-diethylaminoethyl chloride are added and the reaction mixture is stirred first for 3 hours at room temperature and then boiled for 2 hours under reflux while stirring. Sodium chloride soon precipitates. Water is added, the solution is made alkaline to soda and is ethered out. The ether solution after being washed with water is evaporated and the residue is distilled. S-(β-diethylaminoethyl)- O.O - diethyl - dithiophosphoric acid ester boils under 0.2 mm pressure at 108–109°.

Example 2

2.3 parts of finely cut sodium is dissolved, finally by heating under reflux, in 9 parts of dimethylamino-ethanol diluted with 200 parts by volume of anhydrous benzene. 19 parts of diethoxy-thiophosphoryl chloride are then added dropwise at a temperature under 25° and the reaction is completed by heating for half an hour under reflux. The whole is stirred with water, the benzene layer is separated and washed with diluted soda solution and then evaporated. Diethyl-(β-dimethylaminoethyl)-thiophosphoric acid ester boils under 12 mm pressure at 126–129°.

S - (β-diethylaminoethyl) - O.O - diethyl - dithiophos-phoric acid ester as described in example 1 is obtained in a similar manner if diethylaminoethyl mercaptan is used instead of dimethylamino-ethanol, and diethyl-(δ-diethylamino-butyl)-thiophosphoric acid ester is obtained if δ-dimethylamino-butanol is used instead of dimethylamino-ethanol.

The following esters can also be produced by one of the methods described:

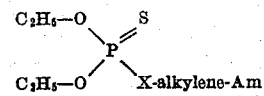

| —X-alkylene-Am | B. P., mm. pressure |
|---|---|
| —S—CH₂—CH₂—N(CH₃)₂ | 96–102°/0.1 |
| —S—CH₂—CH₂—N⟨H⟩ (piperidine) | 133–135°/0.3 |
| —S—CH₂—CH₂—CH₂—N⟨H⟩ (piperidine) | 132–134°/0.1 |
| —S—CH₂—CH₂—N(CH₂—CH₂)₂O (morpholine) | 140–142°/0.2 |
| —S—CH₂—CH(CH₃)—N(CH₃)₂ | |
| —S—CH(CH₃)—CH₂—N(CH₃)₂ | |
| —S—CH₂—CH₂—N⟨H⟩ (pyrrolidine) | |
| —O—CH₂—CH₂—N(CH₃)₂ | 108–109°/0.3 |
| —O—CH₂—CH₂—N(C₂H₅)₂ | 153–156°/12 |
| —O—CH₂—CH₂—N⟨H⟩ (piperidine) | 151–153°/0.35 |
| —O—CH₂—CH₂—CH₂—N(CH₃)₂ | |
| —O—CH₂—CH(CH₃)—N⟨H⟩ (piperidine) | |
| —O—CH(CH₃)—CH₂—N⟨H⟩ (piperidine) | |

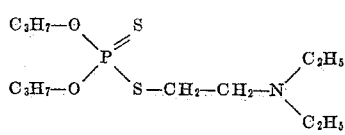

The new phosphoric acid esters can be converted in the usual way by combination with suitable carriers into the application forms usual for agents for combatting pests such as dusting powders or powders which can be suspended in water, emulsions or concentrates for the preparation thereof or solutions in organic solvents. The most important forms of application are more clearly illustrated in the following examples:

Example 3

*Dusting agent.*—1 part of active ingredient, e. g. β-diethylaminoethyl-diethyl thiophosphoric acid ester, is homogeneously ground with 99 parts of a carrier such as, e. g. talcum. Also adhesive agents can be added if desired to improve the adhesive properties of the dust coating on the plant.

Example 4

*Wettable powder.*—10 parts of active ingredient, e. g. S-(β- dimethylaminoethyl)-O.O-diethyl - dithiophosphoric acid ester, and 10 parts of solid pulverised residue of sulphite waste liquor are homogeneously ground with 80 parts of carrier, e. g. chalk, kaolin, bentonite. Should the spraying agent be required to have a greater wetting effect, the residue of the sulphite waste liquor can be replaced by 5 parts of the sodium salt of dibutylnaphthalene sulphonic acid and 5 parts of blood albumin.

Example 5

*Emulsion.*—20 parts of active ingredient, e. g. S-(β-dimethylaminoethyl)-O.O-diethyl - dithiophosphoric acid ester, are dissolved in 40 parts of solvent and mixed with 40 parts of emulgating agent. Mixtures of benzene, toluene, xylene, acetone, low aliphatic alcohols, petroleum distillates for example can serve as solvents. The emulgating agents can be anion active, cation active or non-ionogenic. As examples can be named sulphonates of fatty acid esters, the sulphonate of ricinoleic acid butyl ester, quaternary compounds or condensation products of ethylene oxide with alkyl phenols or fatty alcohols. The concentrates can be emulsified with water to form ready-for-use emulsions.

What we claim is:

1. A basic phosphoric acid ester corresponding to the formula:

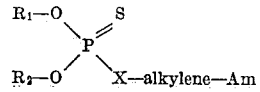

wherein

R₁ and R₂ each represent a lower alkyl radical,
X represents a member selected from the group consisting of oxygen and sulphur,
Am represents a member selected from the group consisting of lower dialkylamino, alkylenimino containing 4 to 5 carbon atoms and morpholino radicals, and
Alkylene represents an alkylene radical containing from 2 to 4 carbon atoms.

2. A basic phosphoric acid ester corresponding to the formula:

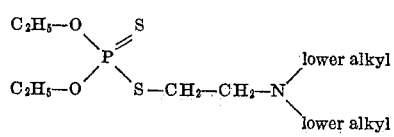

3. A basic phosphoric acid ester corresponding to the formula:

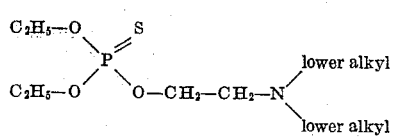

4. A basic phosphoric acid ester corresponding to the formula:

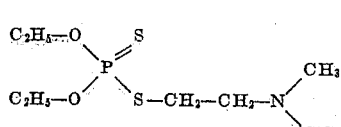

5. A basic phosphoric acid ester corresponding to the formula:

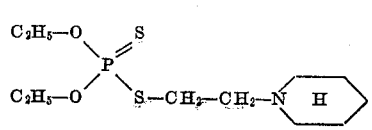

6. A basic phosphoric acid ester corresponding to the formula:

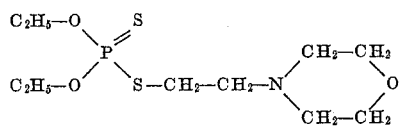

7. A basic phosphoric acid ester corresponding to the formula:

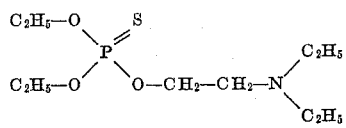

8. An insecticidal and acaricidal composition comprising as active ingredient a basic phosphoric acid ester corresponding to the formula:

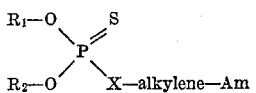

wherein:

$R_1$ and $R_2$ each represent a lower alkyl radical,

X represents a member selected from the group consisting of oxygen and sulphur,

Am represents a member selected from the group consisting of lower dialkylamino, alkylenimino containing 4 to 5 carbon atoms and morpholino radicals, and Alkylene represents an alkylene radical containing from 2 to 4 carbon atoms.

9. Process for combatting pests comprising exposing the pests to a toxic quantity of a compound according to claim 1.

References Cited in the file of this patent

UNITED STATES PATENTS

| | | |
|---|---|---|
| 2,494,283 | Cassaday et al. | Jan. 10, 1950 |
| 2,570,503 | Tawney | Oct. 9, 1951 |
| 2,586,656 | Hook et al. | Feb. 19, 1952 |